US010744639B2

(12) United States Patent
Hongo et al.

(10) Patent No.: US 10,744,639 B2
(45) Date of Patent: Aug. 18, 2020

(54) PARALLEL LINK ROBOT AND OPERATION APPARATUS

(71) Applicant: SONY CORPORATION, Tokyo (JP)

(72) Inventors: Kazuo Hongo, Kanagawa (JP); Kiyoyuki Kikuchi, Miyagi (JP); Hiroki Ebe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 15/768,083

(22) PCT Filed: Sep. 2, 2016

(86) PCT No.: PCT/JP2016/004019
§ 371 (c)(1),
(2) Date: Apr. 13, 2018

(87) PCT Pub. No.: WO2017/072999
PCT Pub. Date: May 4, 2017

(65) Prior Publication Data
US 2018/0297195 A1 Oct. 18, 2018

(30) Foreign Application Priority Data

Oct. 26, 2015 (JP) .................................. 2015-209588
May 13, 2016 (JP) .................................. 2016-096917

(51) Int. Cl.
*B25J 9/10* (2006.01)
*B25J 9/00* (2006.01)

(52) U.S. Cl.
CPC ............. *B25J 9/106* (2013.01); *B25J 9/0015* (2013.01); *B25J 9/0045* (2013.01)

(58) Field of Classification Search
CPC .......... B25J 9/106; B25J 9/0015; B25J 9/0045
See application file for complete search history.

(56) References Cited

U.S. PATENT DOCUMENTS 5,053,687 A * 10/1991 Merlet ................. B25J 17/0216
  318/566
5,354,158 A * 10/1994 Sheldon ............... B23Q 1/5462
  248/631
6,330,837 B1   12/2001 Charles et al.
7,040,033 B2 *  5/2006 Zhu ...................... G01B 21/042
  33/502

(Continued)

FOREIGN PATENT DOCUMENTS

AU        9036098 A      3/1999
JP    2000-334687 A    12/2000

(Continued)

OTHER PUBLICATIONS

International Search Report and Written Opinion of PCT Application No. PCT/JP2016/004019, dated Dec. 6, 2016, 11 pages.

*Primary Examiner* — David M Fenstermacher
(74) *Attorney, Agent, or Firm* — Chip Law Group

(57) ABSTRACT

A parallel link robot includes a movable portion, a base, a plurality of drive sources, a plurality of links, and a tension member. The plurality of drive sources is attached to the base. The plurality of links is respectively connected to the plurality of drive sources. The tension member is connected between the movable portion and at least one of the plurality of links such that a bending tension is generated.

18 Claims, 13 Drawing Sheets

(56) References Cited

U.S. PATENT DOCUMENTS

| | | | | |
|---|---|---|---|---|
| 7,124,660 B2* | 10/2006 | Chiang | ............... | A47B 91/16 |
| | | | | 74/490.05 |
| 7,498,758 B2* | 3/2009 | Baba | ............... | B25J 17/0216 |
| | | | | 318/568.11 |
| 8,020,465 B2* | 9/2011 | Vertechy | ............. | B25J 17/0266 |
| | | | | 74/490.01 |
| 8,452,453 B2* | 5/2013 | Zhang | ............... | B25J 9/0078 |
| | | | | 700/245 |
| 8,505,392 B2* | 8/2013 | Zhang | ............... | F16M 11/043 |
| | | | | 33/503 |
| 9,068,622 B2* | 6/2015 | Malchev | ............. | F16F 15/027 |
| 9,109,743 B2* | 8/2015 | Schwab | ............. | B23Q 1/5462 |
| 9,364,932 B2* | 6/2016 | Valasek | ............. | B23Q 1/545 |
| 9,511,496 B2* | 12/2016 | Sarh | ............... | B25J 9/1697 |
| 9,545,697 B2* | 1/2017 | Whinnem | ............. | B23Q 1/5462 |
| 9,694,455 B2* | 7/2017 | Brown | ............... | B25J 9/0045 |
| 10,180,207 B1* | 1/2019 | Kozub | ............... | F16M 11/18 |
| 10,384,341 B2* | 8/2019 | Olea | ............... | B25J 17/0266 |

FOREIGN PATENT DOCUMENTS

| | | | |
|---|---|---|---|
| JP | 2005-098497 A | 4/2005 |
| JP | 2009-255199 A | 11/2009 |
| JP | 2011-255485 A | 12/2011 |
| JP | 2012-096337 A | 5/2012 |
| JP | 2013-059852 A | 4/2013 |
| JP | 2014-113671 A | 6/2014 |
| WO | 1999/010137 A1 | 3/1999 |
| WO | 2007/069667 A1 | 6/2007 |

* cited by examiner

PARALLEL LINK ROBOT AND OPERATION APPARATUS

CROSS REFERENCE TO RELATED APPLICATIONS

This application is a U.S. National Phase of International Patent Application No. PCT/JP2016/004019 filed on Sep. 2, 2016, which claims priority benefit of Japanese Patent Application No. JP 2015-209588 filed in the Japan Patent Office on Oct. 26, 2015 and also claims priority benefit of Japanese Patent Application No. JP 2016-096917 filed in the Japan Patent Office on May 13, 2016. Each of the above-referenced applications is hereby incorporated herein by reference in its entirety.

TECHNICAL FIELD

The present technology relates to a parallel link robot and an operation apparatus that operates this.

BACKGROUND ART

Parallel link robots have characteristics that a movable portion thereof that serves as a hand can be configured to be extremely light, the robots can be configured relatively inexpensively, there is no need to move drive motors themselves since the drive motors can be gathered at a root, and the like. Therefore, in recent years, parallel link robots are attracting attention as industrial robots.

A parallel link robot described in Patent Literature 1 is generally called a hexa-type. This includes, for example, a total of 3 pairs of arms that are connected to a circumference of a movable plate via a universal joint (see, for example, paragraph [0015] of Patent Literature 1).

A parallel mechanism described in Patent Literature 2 includes a plate-like driving side member and driven side member, a plurality of elastic wires connected between them, and a driving mechanism for controlling a posture of the driving side member (6 linear actuators) (see, for example, paragraphs [0030] and [0043] in specification of Patent Literature 2).

CITATION LIST

Patent Literature

Patent Literature 1: Japanese Patent Application Laid-open No. 2013-059852

Patent Literature 2: Japanese Patent Application Laid-open No. 2012-96337

DISCLOSURE OF INVENTION

Technical Problem

Since the parallel links up to this point as those disclosed in Patent Literatures 1 and 2 have complicated structures, there are problems that assembling is not easy and that they tend to become large. In addition, due to the complicated structures, they tend to become expensive.

An object of the present disclosure is to provide a parallel link robot capable of realizing miniaturization with a simple structure and an operation apparatus thereof.

Solution to Problem

To attain the object described above, a parallel link robot according to the present technology includes a movable portion, a base, a plurality of drive sources, a plurality of links, and a tension member.

The plurality of drive sources are attached to the base.

The plurality of links are respectively connected to the plurality of drive sources.

The tension member is connected between the movable portion and at least one of the plurality of links such that a bending tension is generated.

Since the tension member is connected between the movable portion and the link so as to generate the bending tension, one or more link structures (joint structures) can be structured by a single tension member. As a result, it is possible to realize a miniaturized parallel link robot having a simple structure.

The tension member may be connected to at least one of the plurality of links and may also be connected to the movable portion.

The plurality of links may include a plurality of pairs of links in which a pair of links is provided plurally. Both end portions of the tension member may respectively be connected to at least the pair of links, and a center portion of the tension member may be connected to the movable portion.

Accordingly, two links can be realized by a simple configuration including a single tension member. Further, miniaturization and cost reduction can also be realized.

The base may be formed in a vessel shape to accommodate the plurality of drive sources, and the plurality of links may be connected to power shafts of the plurality of drive sources at an outer circumferential portion of the base.

Accordingly, it becomes possible to gather the plurality of drive sources at one place as much as possible to realize miniaturization, and also easily realize a dustproof and waterproof structure of the drive sources in the base.

The tension member may be a long spring that generates the bending tension by being bent.

Since the tension member is a long spring, it is possible to realize the links with a simple configuration, and also realize miniaturization and cost reduction.

The tension member may be a coil spring.

Accordingly, a plastic deformation of the tension member is unlikely to occur, and thus it becomes difficult for the tension member to break.

In this case, the parallel link robot or an operation apparatus to be described later may further include a sensor that detects a deformation of the coil spring.

The plurality of drive sources may include a plurality of pairs of drive sources in which a pair of drive sources is provided plurally, and the base may include a common attachment surface to which the pair of drive sources is attached such that power shafts of the pair of drive sources become parallel to each other.

Accordingly, it is possible to secure parallelism of the power shafts of the pair of drive sources with high accuracy. In addition, since the structure is simple and easy to assemble, cost reduction can be realized.

The base may include an attachment surface to which the plurality of drive sources are attached, and support the plurality of drive sources such that power shafts of the plurality of drive sources become vertical to the attachment surface.

By arranging a motor closer to an outer side as much as possible, it becomes possible to shorten the power shafts as much as possible and thus raise rigidity thereof.

The tension member may include a first part configuring at least one of the plurality of links, and a second part that generates the bending tension. In this case, a plurality of first parts may be provided so as to configure the plurality of links, and a plurality of second parts may be provided in correspondence with the plurality of first parts.

Accordingly, it becomes possible to reduce the number of components to realize a parallel link robot with a simple configuration, and realize cost reduction.

The parallel link robot may further include a restriction mechanism that restricts a degree of freedom regarding a movement of the movable portion.

Accordingly, a designer can adaptively design a large number of degrees of freedom of the movable portion to be an appropriate number of degrees of freedom, for example.

The restriction mechanism may include a joint portion that is provided between the base and the movable portion and includes a movable area having one or a plurality of degrees of freedom.

The parallel link robot may further include a plurality of sensors that respectively detect movements of the plurality of links.

An operation apparatus according to the present technology includes a movable portion, a base, a plurality of links, a plurality of sensors, and a tension member.

The plurality of links are movably provided on the base.

The plurality of sensors respectively detect movements of the plurality of links.

The tension member is connected between the movable portion and at least one of the plurality of links such that a bending tension is generated.

In this way, the operation apparatus can be realized with a configuration similar to that of the parallel link robot.

The movable portion may include an actuator or a sensor.

Accordingly, the operation apparatus can give a tactile sense or force sense to an operator by the actuator or detect an operation of the operator by the sensor.

The operation apparatus may further include a circuit unit provided in the base. A conductive material of the tension member may function as a conductive wire that electrically conducts the circuit unit and the actuator or the sensor.

Since the conductive material of the tension member functions as a conductive wire, the operation apparatus can be realized with a simple configuration, and cost reduction can also be realized.

Advantageous Effects of Invention

As described above, according to the present technology, a miniaturized parallel link robot having a simple structure can be realized.

It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

1. First Embodiment 1.1) Configuration of Parallel Link Robot

Figure 1:
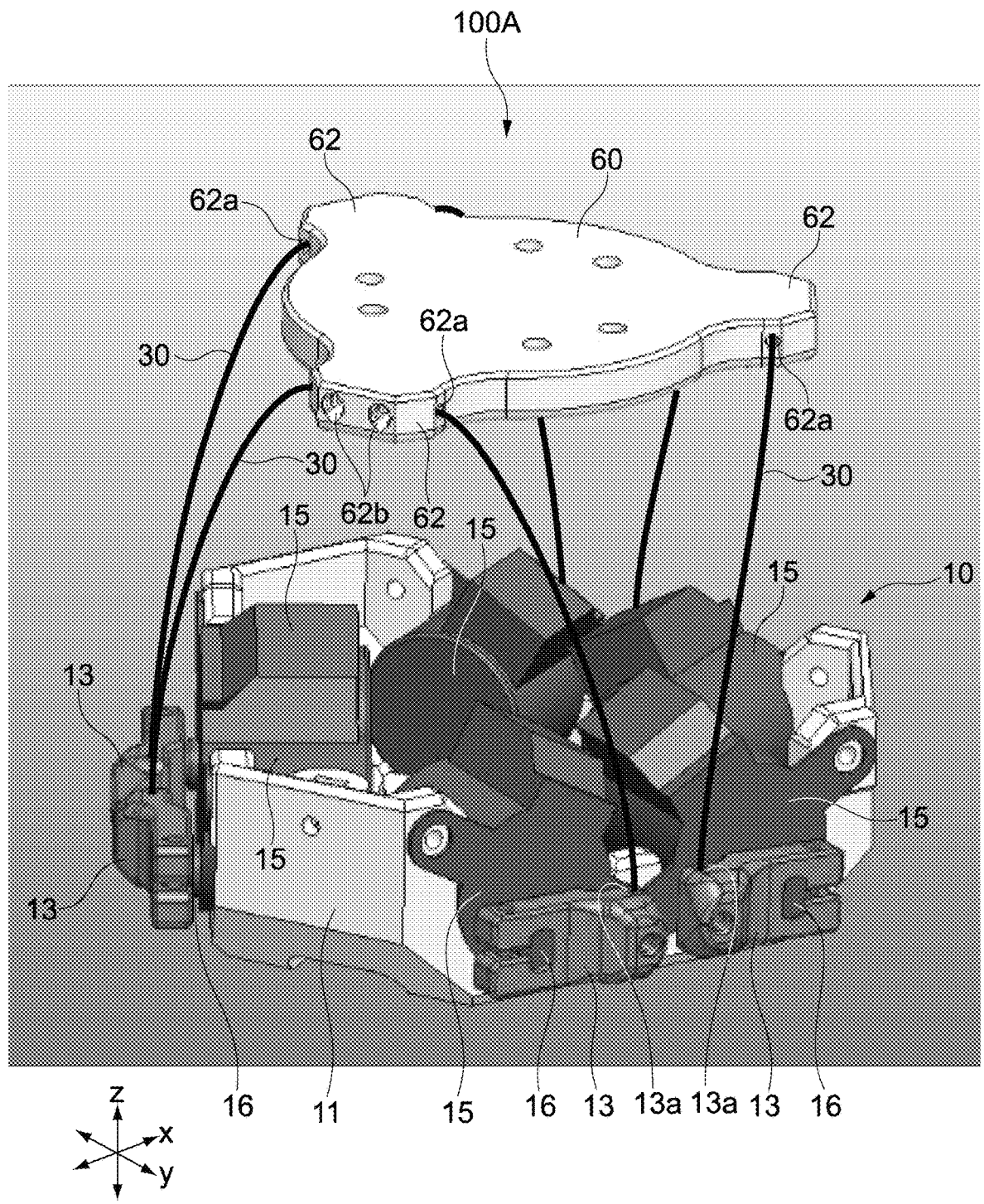
FIG. 1 is a perspective view of a parallel link robot according to an embodiment of the present technology.
Figure 2:
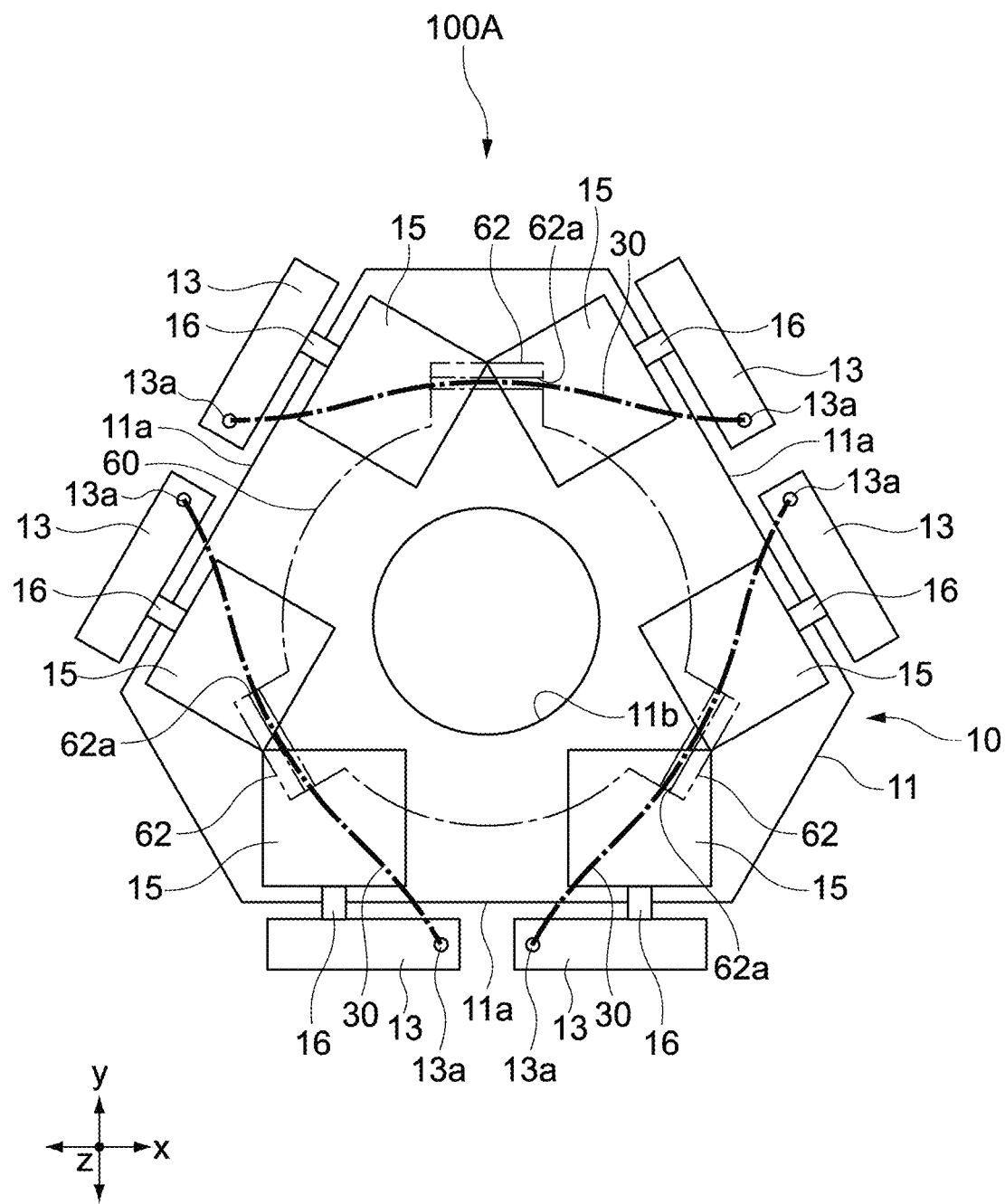
FIG. 2 is a plan view schematically showing the parallel link robot shown in FIG. 1.

FIG. 1 is a perspective view of a parallel link robot according to an embodiment of the present technology. FIG. 2 is a plan view schematically showing the parallel link robot shown in FIG. 1.

A parallel link robot 100A includes a fixed portion 10, a plate-like movable portion 60, and tension members 30 connecting them.

The fixed portion 10 includes a base 11, a plurality of motors (drive sources) 15 fixed to the base 11, and links 13 respectively fixed to rotation shafts 16 as power shafts of these motors 15.

Hereinafter, for convenience of descriptions, a longitudinal direction in which the base 11 and the movable portion 60 are arranged as shown in FIGS. 1 and 2 is assumed to be a z direction. Two mutually-orthogonal axes that are vertical to the z direction and are included in a horizontal plane are assumed to be an x axis and a y axis. However, a posture of this parallel link robot 100A is not necessarily determined such that the longitudinal direction thereof is directed along the z axis, and the parallel link robot 100A can be used in any posture.

The base 11 is formed in a vessel shape (e.g., dish shape), and the plurality of motors 15 are arranged in that vessel. The base 11 includes 3 side portions 11a (see FIG. 2) that are provided at angular intervals of 120° and form a part of an outer shape thereof. Two motors 15 are correspondingly arranged on one side portion 11a, and thus a total of 6 motors 15 are arranged on the 3 side portions 11a. The motors 15 are provided at positions that are (substantially) of the same distance from a center of the base 11.

By providing the 6 motors 15, this parallel link robot 100A is given degrees of freedom regarding translational movements along the 3 axes and rotations about the 3 axes, that is, a total of 6 degrees of freedom regarding the degree of freedom in movements.

The motors 15 each include the rotation shaft 16 that is output toward outside of the base 11. For example, an angle between an output direction of the rotation shaft 16 and the horizontal plane (x-y plane) is set to be 0°, but does not necessarily need to be 0°. The motors 15 are provided on the base 11 such that the rotation shafts 16 thereof are output in a direction orthogonal to the respective side portions 11a. However, the rotation shafts 16 are not limited to the configuration in which they become orthogonal to the respective side portions 11a, and angles thereof can be changed as appropriate.

The base 11 may take any shape such as a frame shape and a plate shape instead of the vessel shape, as long as the motors 15 can be fixed thereto, for example. Alternatively, the base 11 may be a sealed type in which an entire circumference is surrounded by walls.

An opening 11b is provided at a center of the base 11. Electric cables (not shown) are wired from outside the base to each of the motors 15 via this opening 11b. The electric cables are connected to, for example, a control board configuring a control unit 42 (to be described later with reference to FIG. 10) provided at a lower portion of or outside the base 11, and a power supply. The power supply may be a rechargeable battery. By arranging the plurality of motors 15 around the opening 11b and causing the electric cables to pass through the opening 11b in this way, the fixed portion 10 can be miniaturized, which contributes to miniaturization of the parallel link robot 100A.

The links 13 are respectively connected and fixed to the rotation shafts 16 of the motors 15 at an outer circumferential portion of the base 11. The links 13 are rotatable by the motors 15 within a predetermined angular range about the rotation shafts 16. The tension members 30 are connected between the links 13 and the movable portion 60 so as to generate a bending tension by being bent.

A long spring is used as the tension member 30, for example. The "long spring" is a spring that does not cause a substantial elastic deformation in a longitudinal direction thereof but generates a spring force (bending tension) by being bent. In other words, the bending tension is resilience generated by bending the tension member 30. The tension member 30 assumes a shape of a quadratic curve (e.g., ellipse, parabola, and hyperbola) in a state where a bending tension is generated.

The configuration of the long spring includes configurations of a bar-type spring, a plate spring, and the like. Regarding the configuration of the long spring, the spring becomes closer to the bar-type spring as a cross-sectional shape vertical to a longitudinal direction thereof becomes closer to a circle, and becomes closer to the plate spring as the cross-sectional shape becomes more flat. In other words, in the present technology, it is not important to distinguish the bar-type spring and the plate spring from each other. Any material such as metal, resin, and rubber may be used as the material of the long spring.

In this embodiment, the tension member 30 is structured by a metal wire. One end portion of the tension member 30 is connected to one link 13, and the other end portion thereof is connected to another link 13. A center portion of the tension member 30 is connected to the movable portion 60. By connecting one tension member 30 to the two links 13 and the movable portion 60 so as to be bent, the tension member 30 generates a bending tension.

The two links 13 to which one tension member 30 is connected configure a pair of links. Therefore, a total of 6 links 13 form 3 pairs of links as a plurality of pairs of links. The pair of links is two adjacent links 13 respectively provided on different side portions 11a. Further, regarding the motors 15, in correspondence with the plurality of pairs of links, a pair of motors 15, 15 is respectively connected to the pair of links 13, 13 so as configure a plurality of pairs of motors (3 pairs of motors in this embodiment).

The pair of links may be two adjacent links 13 provided on the same side portion 11a. In this case, the rotation shafts of the motors respectively connected to that pair of links are arranged close to each other, and the tension member is fixed to the links at positions more on the outer side than those rotation shafts along the side portion 11a.

It should be noted that a combination of a half of one tension member 30 (portion of one tension member 30 between one link 13 and movable portion 60) and that one link 13 may be referred to as "link structure" in descriptions below.

The base 11 includes an attachment surface 11c (see FIG. 1) along the side portions 11a, and the pair of motors 15, 15 are attached to this attachment surface 11c such that the rotation shafts 16, 16 of the pair of motors 15, 15 become parallel to each other. By attaching the pair of motors 15, 15 to one common attachment surface 11c in this way, it becomes possible to secure parallelism of the rotation shafts 16, 16 with high accuracy. In addition, since the structure is simple and easy to assemble, cost reduction can be realized.

Further, the rotation shafts 16, 16 of the pair of motors 15, 15 are arranged vertical to the attachment surface 11c. In this case, by arranging the motors as close to the outer side as possible, it becomes possible to shorten the power shafts as much as possible to thus raise rigidity. Moreover, an area of the movable portion 60 can be designed as appropriate on the basis of lengths of the rotation shafts 16 (on basis of arrangement of links 13). Particularly in a case where the movable portion 60 is used as a stage, designing an area of the stage as appropriate is advantageous.

As shown in FIG. 1, the movable portion 60, the tension member 30, and the links 13 are provided on the base 11 such that the bending tensions of the tension members 30 are balanced at an origin position of the movable portion 60. At the origin position of the movable portion 60, all of the displacements of the movable portion 60 along the 3 axes are 0, and all the rotation angles about the 3 axes are 0° as shown in FIG. 1. At the origin position, the links 13 assume such postures that longitudinal directions thereof become parallel to the horizontal plane (x-y plane), for example. The rotation angles of the links 13 in a state where the movable portion 60 is at the origin position in this way are assumed to be 0°.

A hole 13a is provided at an operation end portion of each of the links 13, and the end portions of the tension members 30 are fit and connected to these holes 13a. It is favorable to fix the links 13 and the tension members 30. As a fixing method therefore, fitting, use of an adhesive, welding, screwing, and the like are conceivable. However, those do not necessarily need to be fixed. For example, a structure in which the tension member 30 is capable of rotating inside the hole (bottomed hole) 13a of the link 13, that is, the tension member 30 is capable of rotating about an axis in the longitudinal direction of the tension member inside the hole 13a, is also possible.

As shown in FIG. 2, in the movable portion 60, attachment portions 62 each including a through hole 62a penetrating the attachment portion 62 in the horizontal direction are provided at angular intervals of 120°. It is favorable to fix the tension member 30 in the through hole 62a. As a fixing method therefore, fitting, use of an adhesive, welding, screwing, and the like are conceivable. In the case of screwing, screws (not shown) are inserted in a direction orthogonal to the through hole 62a from screw holes 62b (see FIG. 1) provided at an outer circumferential portion of the attachment portion 62, to thus fix the tension member 30.

Similar to that described above, the movable portion 60 and the tension member 30 do not necessarily need to be fixed. For example, a structure in which the tension member 30 is capable of rotating, that is, the tension member 30 is capable of rotating about an axis in the longitudinal direction of the tension member, inside the through hole 62a, is also possible.

1.2) Operational Example of Parallel Link Robot

Figure 3:
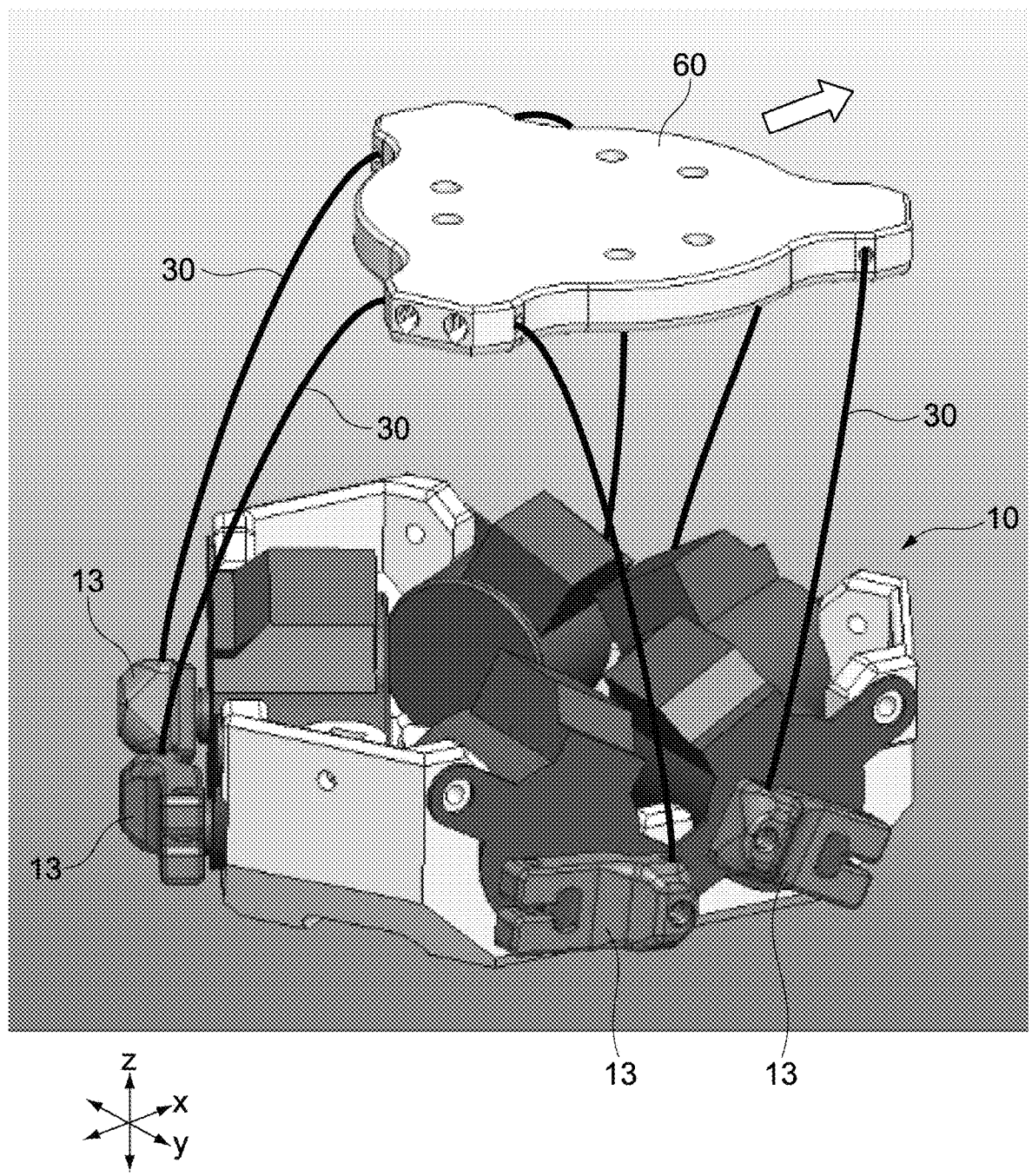
FIG. 3 shows a state where a movable portion makes a translational movement in an x direction.
Figure 4:
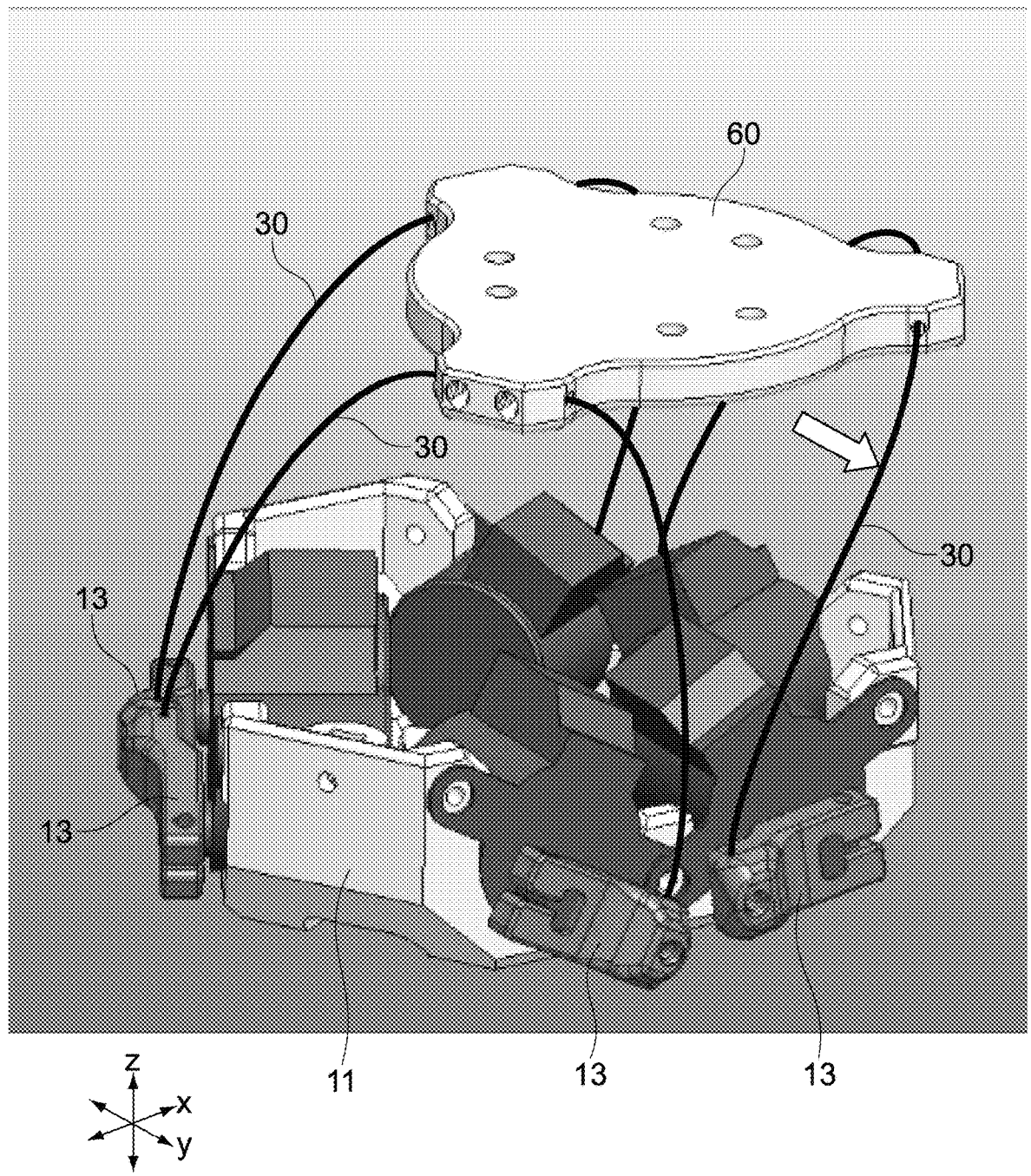
FIG. 4 shows a state where the movable portion makes a translational movement in a y direction.
Figure 5:
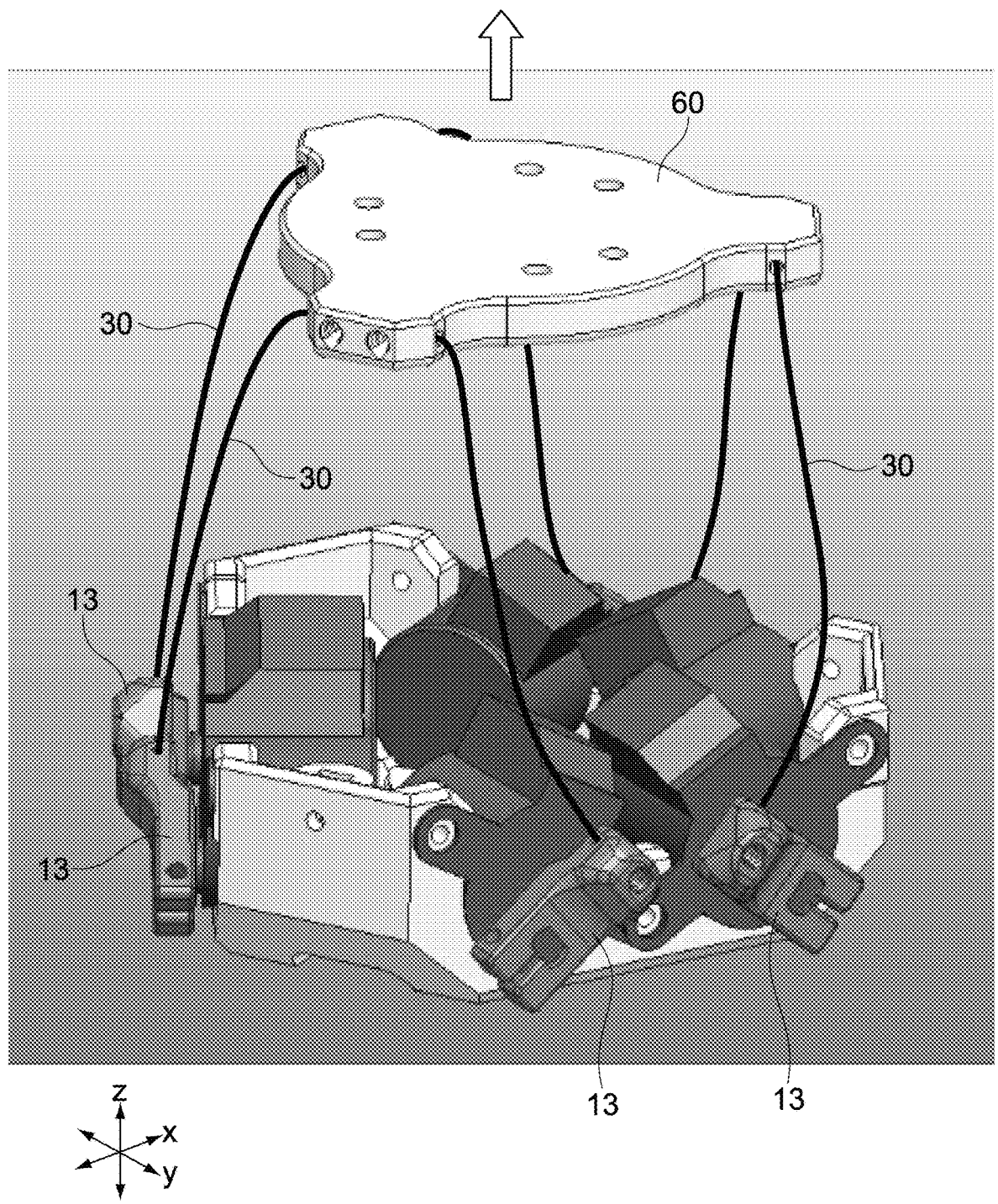
FIG. 5 shows a state where the movable portion makes a translational movement in a z direction.

FIG. 3 shows a state where the movable portion 60 makes a translational movement along the x direction. FIG. 4 shows a state where the movable portion 60 makes a translational movement along the y direction. FIG. 5 shows a state where the movable portion 60 makes a translational movement along the z direction. These figures respectively show states where the movable portion 60 makes translational movements by arbitrary displacement amounts.

Figure 6:
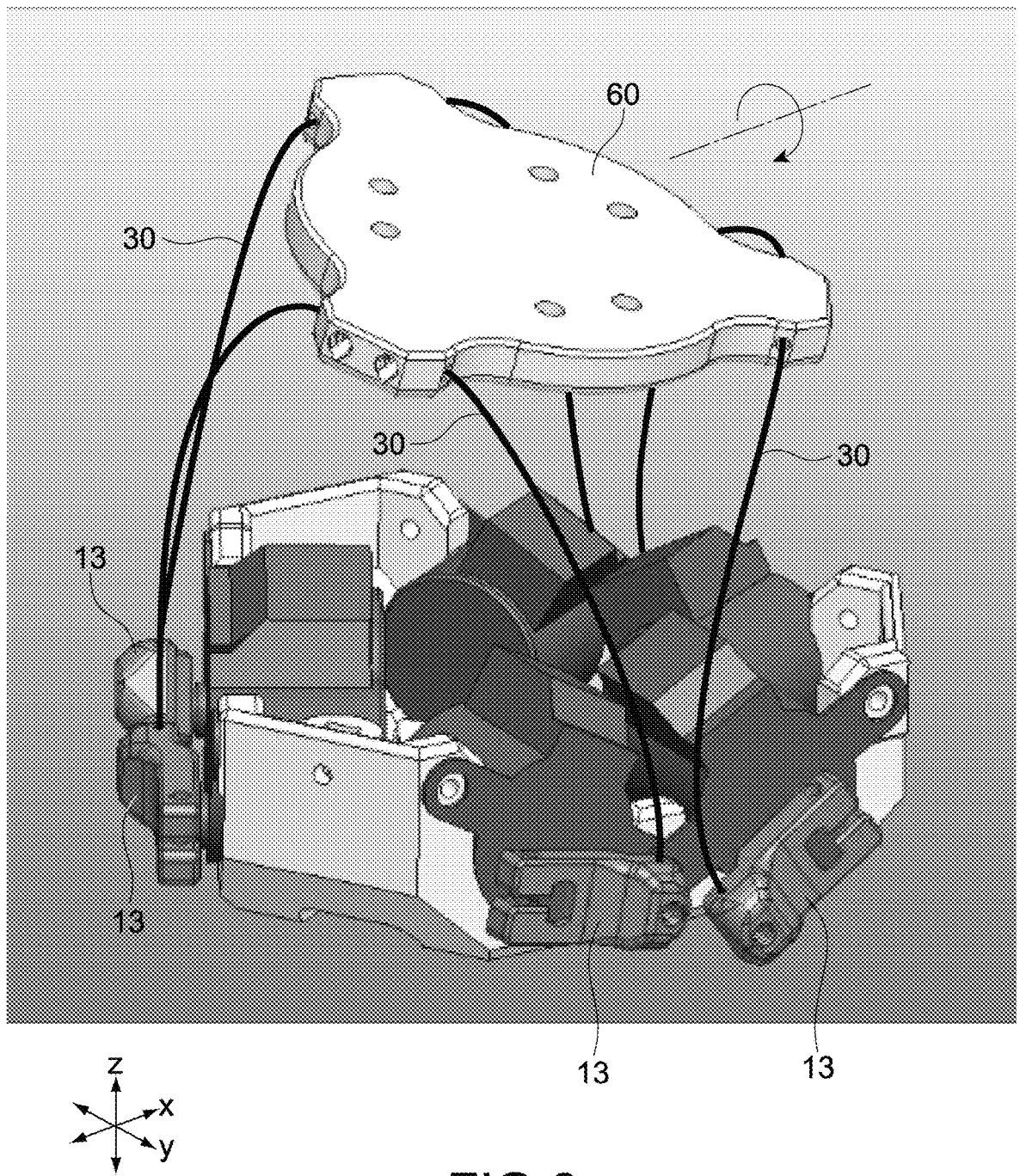
FIG. 6 shows a state where the movable portion rotates about an x axis.
Figure 7:
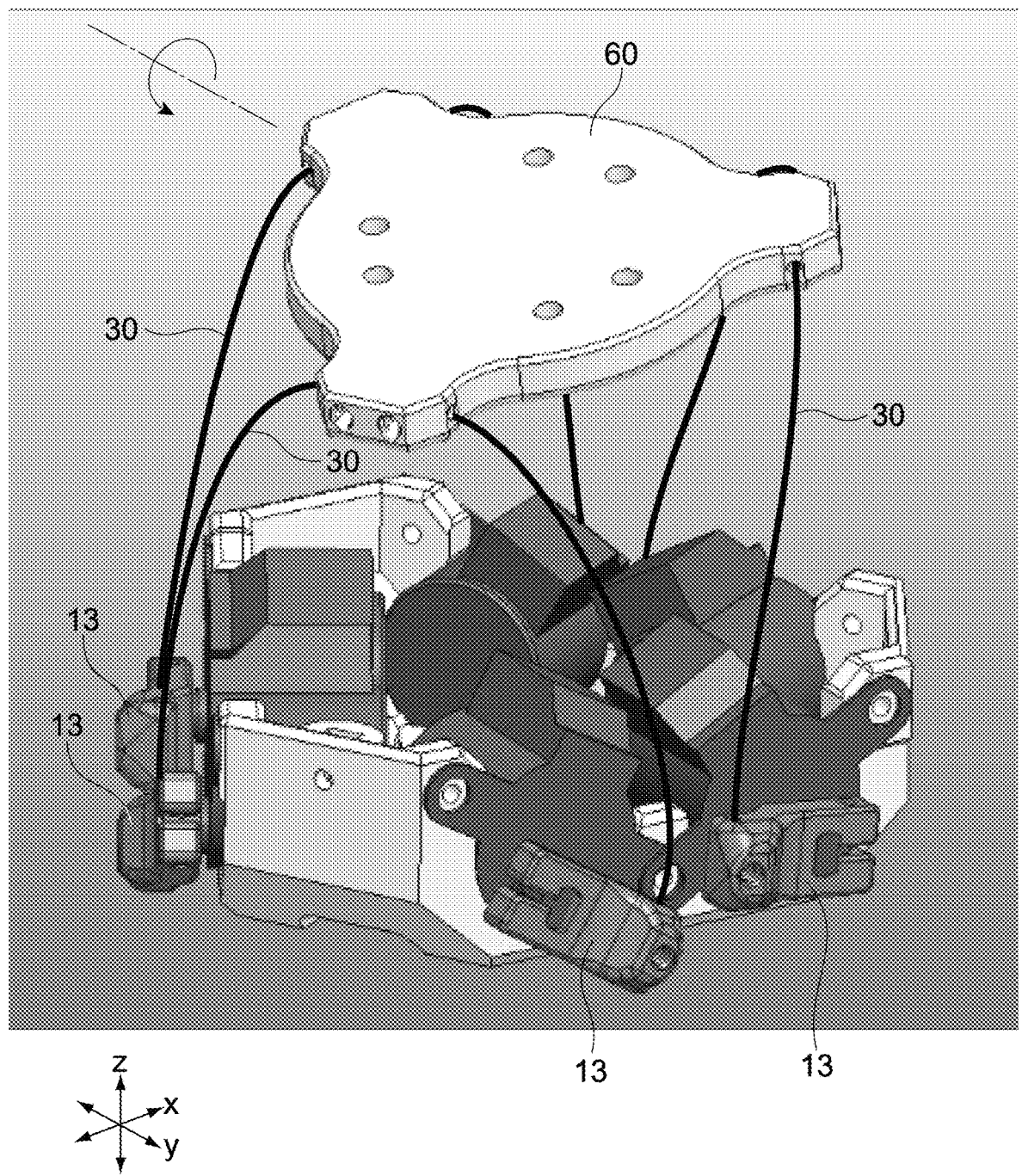
FIG. 7 shows a state where the movable portion rotates about a y axis.
Figure 8:
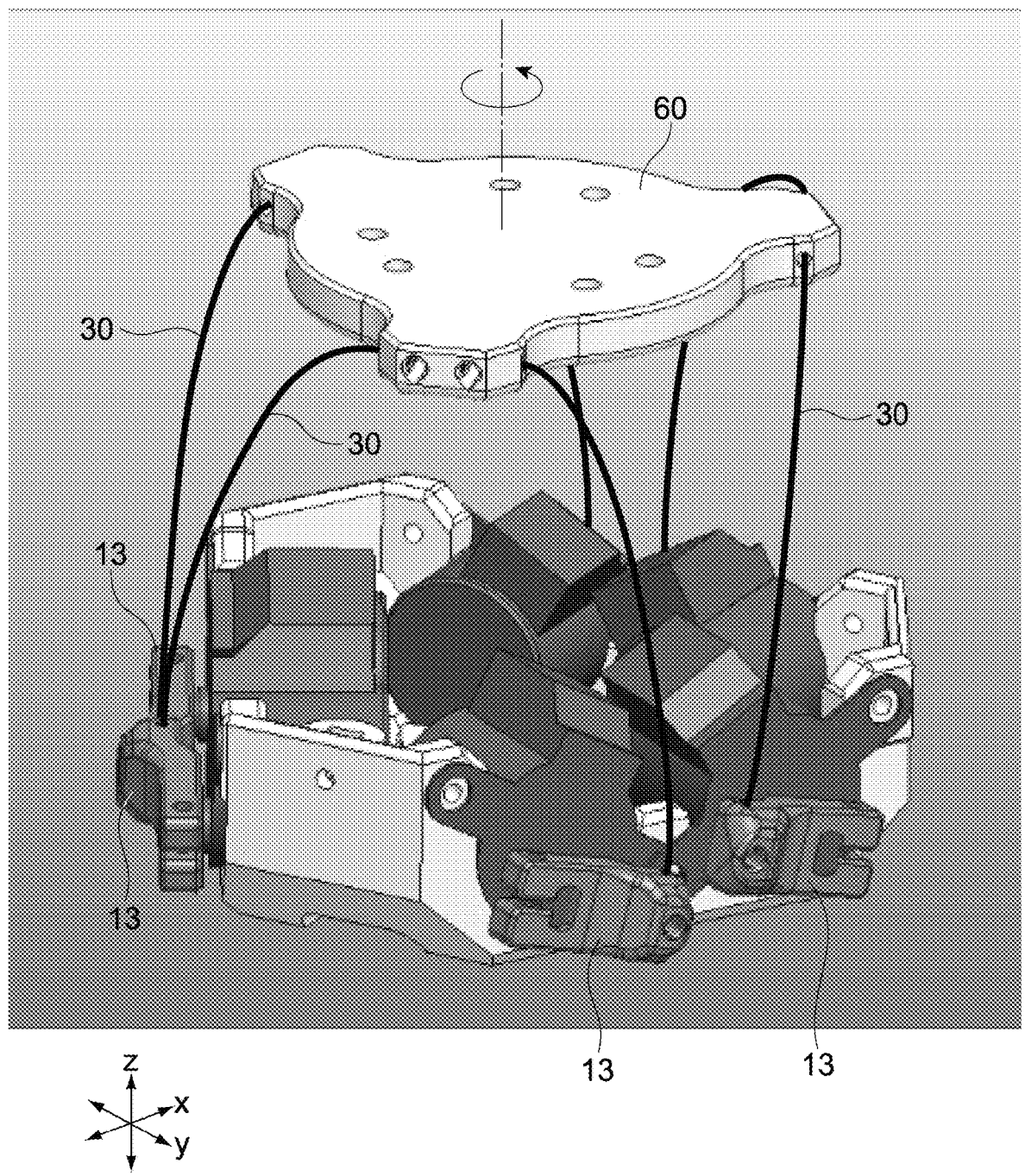
FIG. 8 shows a state where the movable portion rotates about a z axis.

FIG. 6 shows a state where the movable portion 60 is rotated about the x axis. FIG. 7 shows a state where the movable portion 60 is rotated about the y axis. FIG. 8 shows a state where the movable portion 60 is rotated about the z axis. These figures respectively show states where the movable portion 60 is rotated by arbitrary rotation angles.

As shown in FIGS. 3 to 8, since the tension member 30 does not have a rotation joint, the tension member 30 exerts a function as a joint by being deformed.

By independently and arbitrarily controlling the rotation angles of the respective links 13, the translational movements of the movable portion 60 along the respective axial directions and the rotations about the respective axes become possible. For example, in order to enable such an operation to be made, it is only necessary to store a lookup table for associating a combination of the rotation angles of the respective motors 15 (rotation angles of respective links 13) and the position of the movable portion 60, in a control unit 42 (not shown).

By combining at least two of the operations out of these x translational movement, y translational movement, z translational movement, rotation about the x axis, rotation about the y axis, and rotation about the z axis, movements of at least 2 degrees of freedom of that combination become possible.

1.3) Advantages of Parallel Link Robot

Such a parallel link robot 100A has a configuration in which the motors 15 are connected by the links 13 and the tension members 30. Specifically, one link structure (joint structure) can be configured by a combination of a half of one tension member 30 (portion between one link 13 and movable portion 60) and that one link 13. In other words, two link structures can be configured by only a pair of links and one tension member 30. Therefore, it is possible to realize a link structure with an extremely simple structure. In addition, since the link structure is simple, it is possible to reduce the number of components and thus realize a miniaturized parallel link robot 100A having a simple structure. Furthermore, due to the simple structure, cost reduction can also be realized. Accordingly, mass production of products is facilitated.

Due to the realization of miniaturization of the parallel link robot 100A, transportation costs can be reduced. For example, in a case where the parallel link robot 100A is to be assembled and used in outer space, there are great advantages such as ease of assembly and reduction in component transportation costs.

Further, by miniaturizing the parallel link robot 100A, resolution of movements of the movable portion can also be made high.

Since the tension member 30 is a long spring, it is possible to impart a tension to the long spring in advance by merely bending the long spring and attaching it to the links 13 and the movable portion 60 at a time of assembly. In other words, it is possible to easily cause a tension to be generated in the tension member 30.

Further, since the tension member 30 is a long spring, a strength (rigidity) and length thereof can be changed with ease. Therefore, mechanical characteristics of the link structure can be easily adjusted in accordance with usages. The strength of the tension member can be adjusted by the number, material, and cross-sectional diameter thereof, and the like.

Since the link structure is extremely light, a parallel link robot 100A having extremely small inertia can be realized.

The motors 15 are arranged so as to be accommodated in the base 11, and the links 13 are connected to the rotation shafts 16 at the outer circumferential portion of the base 11. Accordingly, the motors 15 can be gathered at one place as much as possible, and the fixed portion 10 can be miniaturized. In addition, it is possible to easily realize a dustproof and waterproof structure of the fixed portion 10. In other words, it is possible to easily add a dustproof and waterproof function to the parallel link robot 100A.

Since the tension members 30 and the movable portion 60, which are members other than the fixed portion 10, can be easily replaced, it becomes easy to use the parallel link robot 100A in an environment that requires cleanliness.

Since a lubricant exists only in the motors 15, by forming the base 11 in a casing shape, dirt does not scatter.

In a case where an excessive load is applied to the movable portion 60 while the parallel link robot 100A is operated, a cushion function can be caused to be exerted in each link structure by using a bending tension (spring force) of the tension members 30. Accordingly, a damage to the fixed portion 10 can be reduced, and the fixed portion 10 can be safely maintained in extreme environments such as outer space and underwater. In addition, a worker can perform work while being safe to the surroundings.

By using the cushion function of the tension members 30 during the operation of the parallel link robot 100A, the parallel link robot 100A can also be used in a situation where it is unnecessary to highly accurately position the movable portion 60. For example, a case where, in a case where a holding portion that holds a specific component is provided in the movable portion 60, the movable portion 60 moves so as to fit that component in a hole having a tapered inner surface, will be assumed. In this case, since the bending tension of the tension members 30 exerts the cushion function, even if the movable portion 60 is not positioned highly accurately, if simple positioning of a certain degree is performed, that component can be moved along the tapered inner surface so as to be fit into that hole.

1.4) Example of Application of Parallel Link Robot

For example, in an automatic inspection process in a manufacturing process of electronic apparatuses such as a smartphone, an appearance inspection of that electronic apparatus is currently performed using a camera while changing an angle by an expensive robot arm. The parallel link robot 100A according to the present technology can be used in place of the robot arm. In this case, the camera photographs the electronic apparatus in a field of view including the entire electronic apparatus. The captured image is fed back to the control unit 42 of the parallel link robot 100A, and thus the parallel link robot 100A can appropriately perform positioning control of the movable portion 60.

The parallel link robot 100A can be mass-produced at low costs. Therefore, as will be described later with reference to FIG. 10, it is possible to use the parallel link robot 100A as a home gadget in which a child operates the parallel link robot 100A (via operation apparatus 200) or the parallel link robot 100A responds to the child.

Alternatively, this parallel link robot 100A can be used as an exhibition stand for displaying goods and products. For example, an operation in which the parallel link robot 100A moves the movable portion 60 so that visitors can easily see the goods and products in an exhibition hall, can be realized. In this case, as will be described later with reference to FIG. 10, a configuration in which the visitor operates the parallel link robot 100A using the operation apparatus 200 is also possible.

In addition, this parallel link robot 100A can be used as a medical manipulator, a focus operation of a camera, or a workbench.

2. Second Embodiment

Figure 9:
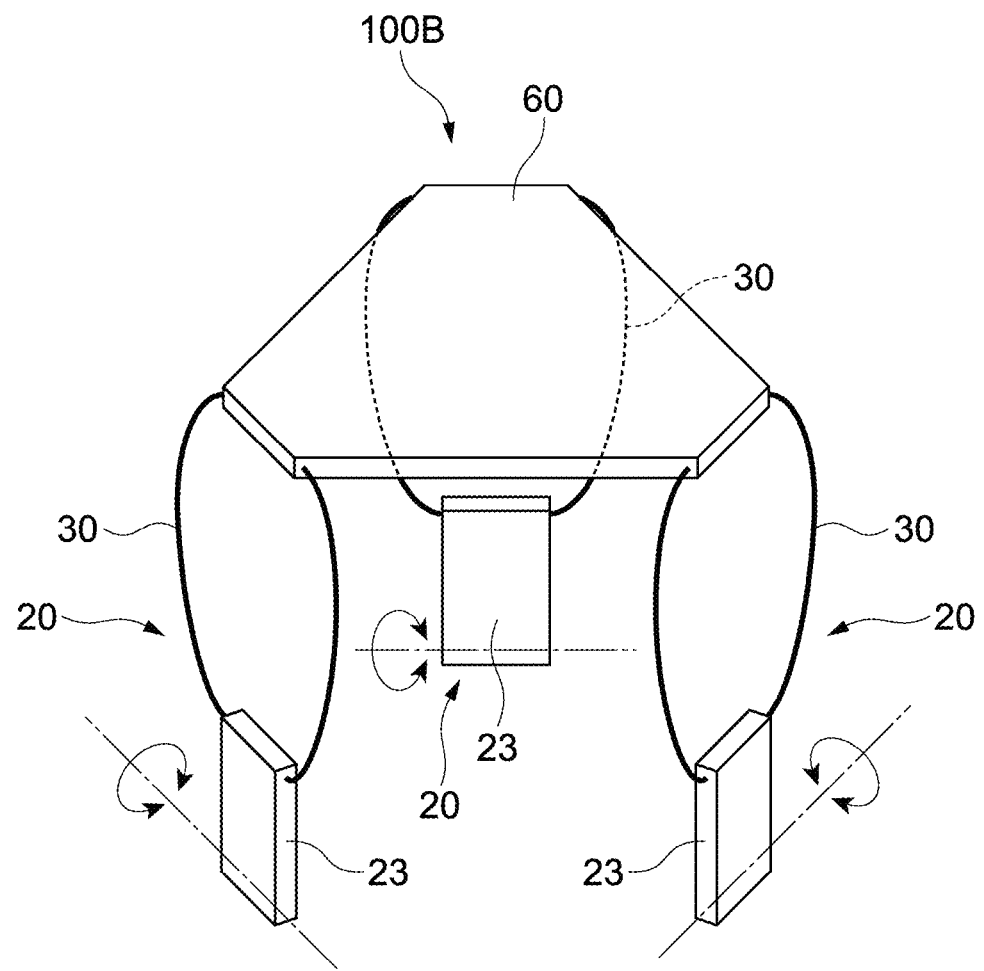
FIG. 9 is a perspective view showing a main portion of a parallel link robot according to a second embodiment of the present technology.

FIG. 9 is a perspective view showing a main portion of a parallel link robot according to a second embodiment of the present technology. In descriptions below, elements including members, functions, and the like substantially similar to those of the parallel link robot 100A according to the embodiment shown in FIG. 1 and the like are denoted by the same symbols, descriptions thereof will be simplified or omitted, and different points will mainly be described.

The parallel link robot 100B according to this embodiment includes 3 link structures 20. One link structure 20 includes a link 23 and the tension member 30 connected between the link 23 and the movable part 60 so as to generate a bending tension. One tension member 30 is connected to one link 23. Both end portions of the tension member 30 are connected to an operation end of the link 23 so as to form a loop, and the movable portion 60 is connected to the center portion of the tension member 30.

A rotation shaft of a motor (not shown) is fixed to an end portion of the link 23 on the other side of the operation end portion. The rotation shafts are respectively set so as to be included in one plane. The 3 motors independently drive the respective links 23 within a predetermined rotation angle range. The motors are attached to a base (not shown).

With such a configuration, the parallel link robot 100B can cause the movable portion 60 to make a translational movement within the one plane described above, that is, the movable portion 60 has 3 degrees of freedom regarding the degree of freedom of movements (translational movements) within one plane.

3. Third Embodiment

Figure 10:
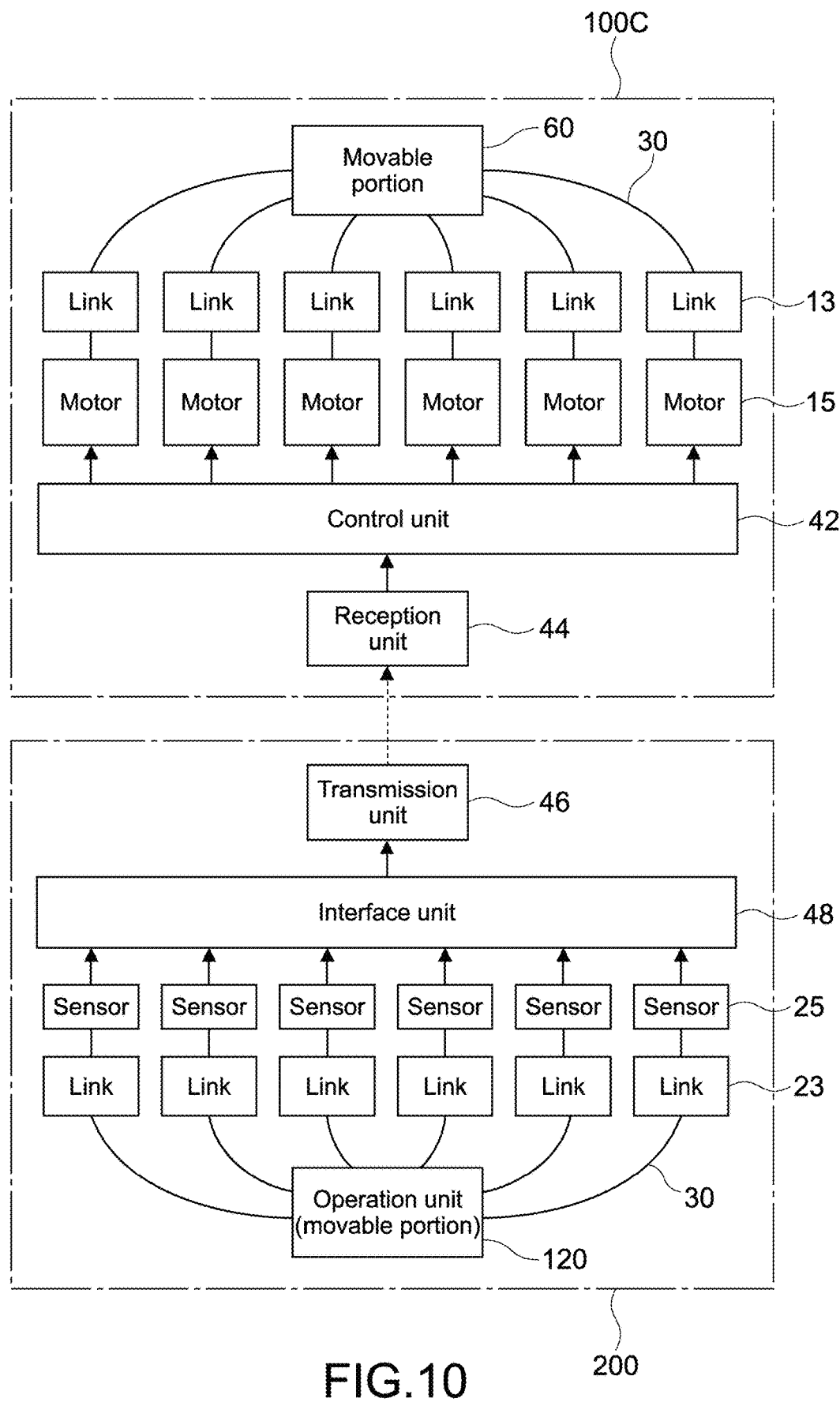
FIG. 10 is a block diagram showing a configuration of an apparatus according to a third embodiment.

Next, a third embodiment will be described. FIG. 10 is a block diagram showing a configuration of an apparatus according to the third embodiment. This apparatus includes a parallel link robot 100C and the operation apparatus 200 that operates this. The parallel link robot 100C is an apparatus obtained by adding a reception unit 44 to the parallel link robot 100A according to the first embodiment. An apparatus obtained by adding the reception unit 44 to the parallel link robot 100B according to the second embodiment may be used in place of this parallel link robot 100C.

The reception unit 44 includes a function of receiving an operation signal that has been input by a user and transmitted from a transmission unit 46 of the operation apparatus 200 and outputting it to the control unit 42. The control unit 42 includes a driver of each motor 15 and includes a function of generating a control signal for moving the movable portion 60 and outputting that control signal to each driver.

The operation apparatus 200 includes an operation unit 120, the tension members 30, the links 23, sensors 25, an interface unit 48, and the transmission unit 46. The operation unit 120, the tension members 30, and the links 23 respectively have substantially the same configuration as the movable portion 60, tension members 30, and links 23 of the parallel link robot 100C (100A).

The operation unit 120 can be easily operated as long as it has a grip portion such as a stick, for example, as a member that can be operated by the user.

As the sensors 25, for example, a rotary encoder, a potentiometer, or the like that detects an angular displacement of a rotation of the links 23 is used. As will be described later, in the case of a device in which the links 23 make linear movements, a sensor that detects such a linear displacement is used as the sensor 25.

The interface unit 48 includes an interface function for outputting respective detection signals transmitted from the sensors 25 to the transmission unit 46.

The transmission unit 46 includes a function of transmitting a detection signal (operation signal of user) to the reception unit 44 of the parallel link robot 100C. The transmission unit 46 and the reception unit 44 are connected by wires or connected wirelessly. As a communication means thereof, for example, any well-known means can be adopted.

Such a system is applicable to, for example, toys, game machines, and the like. Without being limited to the use for games, any application target may be adopted as long as it is a target to which the technology of the present system, in which the user operates the operation apparatus 200 to move (movable portion 60 of) the parallel link robot 100C, is applicable.

The system including the parallel link robot 100C and the operation apparatus 200 according to the third embodiment can be applied to bilateral control, for example. The bilateral control mainly refers to force tactile sense feedback control that is performed between a first apparatus (e.g., main apparatus) and a second apparatus (e.g., slave apparatus). Specifically, the bilateral control includes not only control under which the second apparatus externally outputs a force corresponding to a force input to the first apparatus by the user (operator), but also control under which the second apparatus feeds back the received force to the first apparatus. In the third embodiment, the first apparatus corresponds to the operation apparatus 200, and the second apparatus corresponds to the parallel link robot 100C.

For example, the bilateral control is applied to robots and drones that are remotely operated by the operation apparatus 200. The parallel link robot 100C is used as the robot or drone. In this case, the bilateral control can also be applied to a hand-eye system.

Alternatively, the bilateral control system realized in the third embodiment can be applied to VR (Virtual Reality), for example. Examples of VR include games, operation simulations, and the like.

4. Fourth Embodiment

Figure 11A:
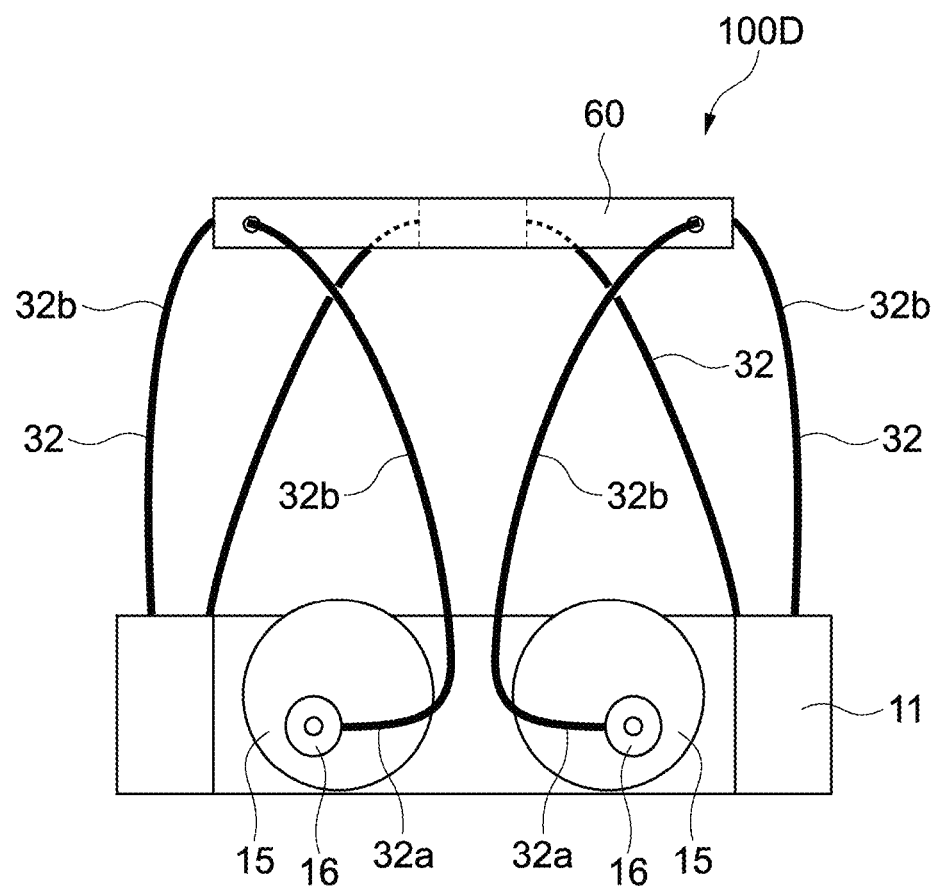
FIG. 11A is a side view of a parallel link robot according to a fourth embodiment.

FIG. 11A is a side view showing a parallel link robot according to a fourth embodiment. Tension members 32 of this parallel link robot 100D include a function of the links 13 according to the first embodiment. The tension members 32 each include a first part 32a configuring a link and a second part 32b that generates a bending tension.

Figure 11B:
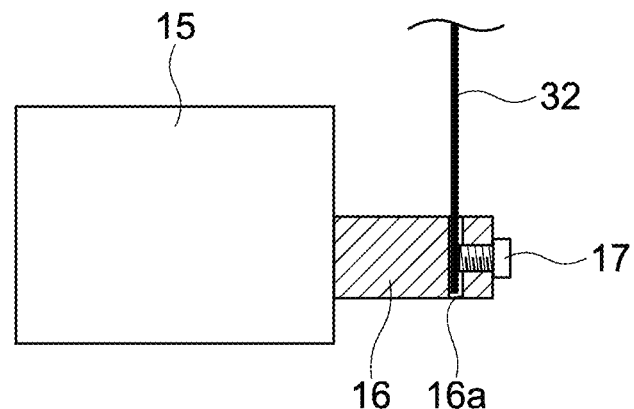
FIG. 11B is a diagram showing a tension member and rotation shaft of the parallel link robot shown in FIG. 11A.

As shown in FIG. 11B, both ends of a wire serving as the tension member 32 are directly connected to the rotation shafts 16 of the motors 15 as the drive sources, respectively. For example, a through hole 16a that penetrates the rotation shaft 16 in a radial direction is provided in the rotation shaft 16, and an end portion of the wire is inserted into that through hole 16a. In the through hole 16a, the end portion of the wire is pressed by a screw 17 inserted from a tip end of the rotation shaft 16, to thus fix the wire to the rotation shaft 16. It should be noted that a speed reducer may be provided in the motor 15.

A "bent trace" appears between the first part 32a and the second part 32b, and thus the tension member 32 keeps its shape.

With the configuration as described above, it becomes possible to reduce the number of components to realize the parallel link robot 100D with a simple configuration, and also realize cost reduction.

5. Fifth Embodiment

Figure 12A:
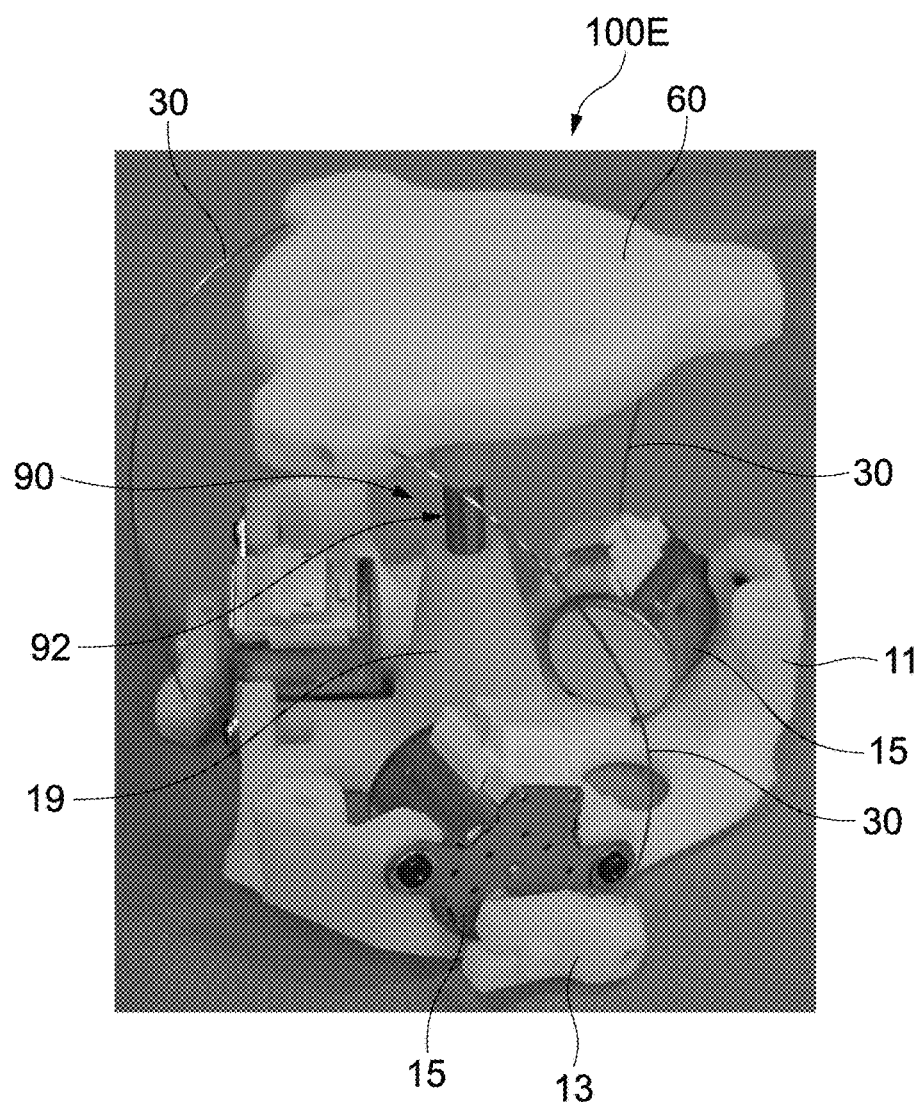
FIG. 12A is a photograph showing a parallel link robot according to a fifth embodiment.

FIG. 12A is a photograph showing a parallel link robot according to a fifth embodiment. This parallel link robot 100E includes a restriction mechanism 90 that restricts the degree of freedom of movements of the movable portion 60. The restriction mechanism 90 includes, for example, a joint portion 92 that is provided between the base 11 and the movable portion 60 and connects them.

For example, 3 motors 15 are mounted on the base 11 at equiangular intervals (120°) when viewed from the top, and 3 links 13 are respectively connected to these motors 15. Then, the 3 links 13 and 3 tension members 30 are connected, respectively.

Figure 12B:
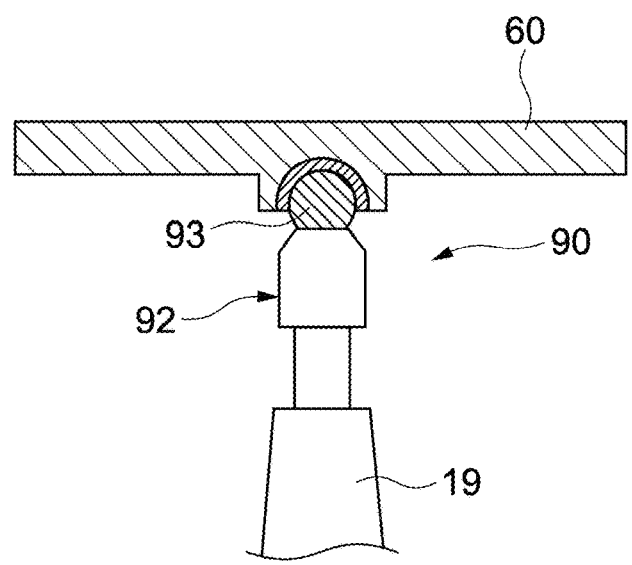
FIG. 12B is a side view mainly showing a joint portion of FIG. 12A.

FIG. 12B is a side view mainly showing the joint portion 92 shown in FIG. 12A. The joint portion is constituted of a ball joint, for example, and a ball 93 provided at an upper portion is rotatably connected to the movable portion 60. A lower portion of the joint portion 92 is supported by a support portion 19 provided so as to protrude upward from the base 11.

By the restriction mechanism 90 that restricts the degree of freedom of movements of the movable portion 60 in this way, the designer can adaptively design a large number of degrees of freedom of the movable portion 60 to be an appropriate number of degrees of freedom.

According to the parallel link robot 100E of this embodiment in particular, it becomes possible for the movable portion 60 to rotate about the 3 axes of the x, y, and z axes. Accordingly, it becomes possible to realize a parallel link having a triaxial rotational degrees of freedom with a simple configuration and low costs.

In addition, since the movable portion 60 is connected to the base 11 by the joint portion 92, the movement of the movable portion 60 is stabilized.

The joint portion 92 does not necessarily need to be a ball joint and may be other triaxial joints as long as it can realize the triaxial degrees of freedom. Alternatively, the joint portion 92 may include a movable range having 2 degrees of freedom or less depending on the number of motors 15, instead of the movable range having the triaxial degrees of freedom.

A spring may be used as the restriction mechanism 90 instead of the joint portion 92, for example. As the spring, a coil spring, a plate spring, or the like is used.

The technology of the parallel link robot 100E according to the fifth embodiment is also applicable to an operation apparatus as described in the third embodiment (FIG. 10).

6. Sixth Embodiment

Figure 13:
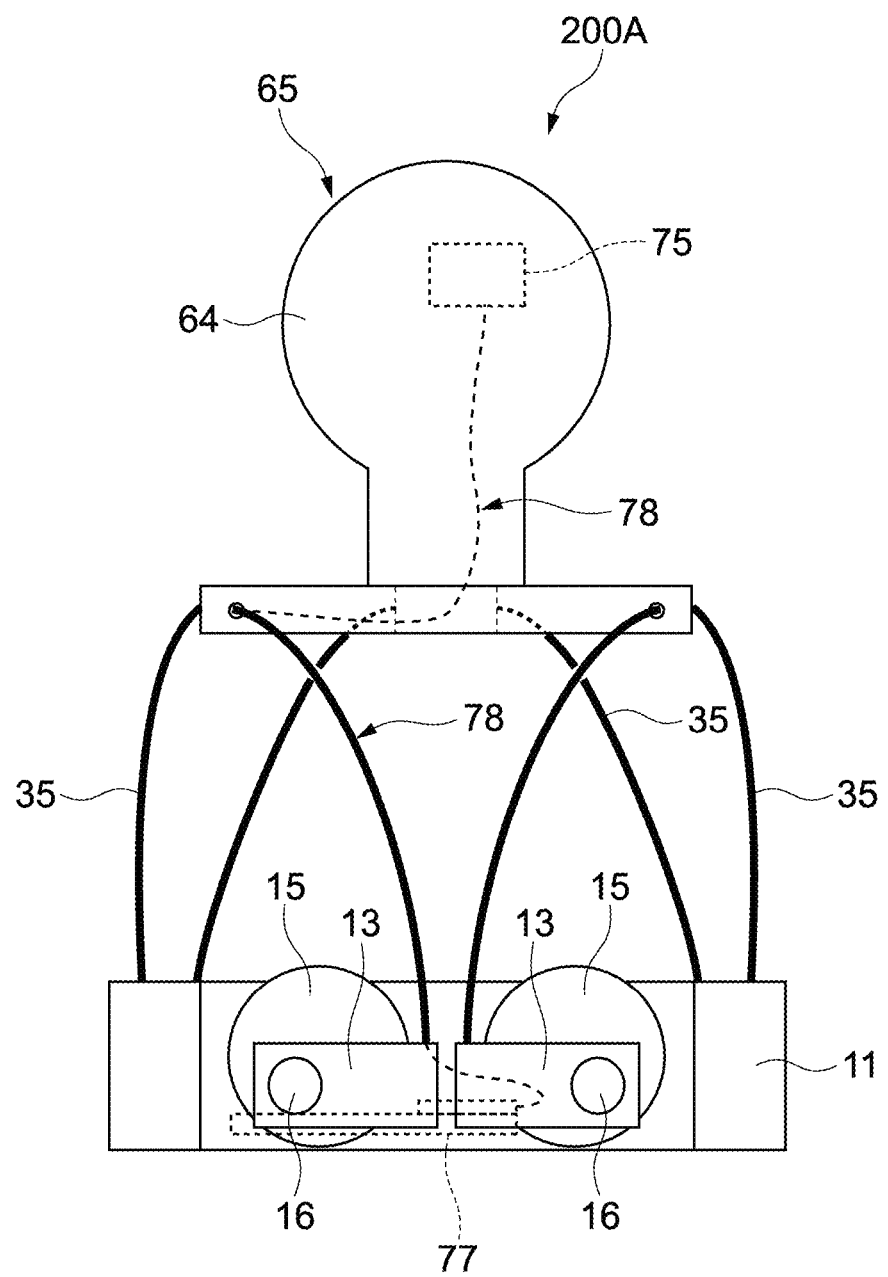
FIG. 13 is a schematic diagram showing an apparatus according to a sixth embodiment of the present technology, that is, an operation apparatus herein.

FIG. 13 is a schematic diagram showing an apparatus according to a sixth embodiment of the present technology, that is, an operation apparatus herein. As described in the third embodiment, a movable portion 65 of this operation apparatus 200A includes a grip portion (or knob portion) 64 that makes is easy for the operator to operate the operation apparatus.

For example, an actuator 75 is provided in the grip portion 64. A plurality of actuators 75 may be provided. The actuator 75 presents a force sense or tactile sense to the operator. As the actuator 75, for example, a voice coil motor, a piezoelectric device, a vibration motor, or the like is used.

In the operation apparatus 200A configured as described above, the actuator 75 can give a tactile sense or force sense to fingers of the operator.

For example, a circuit board (circuit unit) 77 is provided in the base 11 of the operation apparatus 200A. A power supply circuit (not shown) is mounted on the circuit board 77. Alternatively, a power supply circuit mounted on another substrate (not shown) is connected to this circuit board 77. For example, power and control signals are transmitted from the circuit board 77 to the actuator 75.

In this embodiment, tension members 35 may be used as a part of electrical wiring 78 to the actuator 75. Specifically, a conductive material as a main material configuring the tension members 35 functions as a part of the electrical wiring 78 connecting the actuator 75 and the circuit board 77. The tension members 35 may be obtained by covering a conductive wire with an insulator.

With such a configuration, the operation apparatus can be realized with a simple configuration, and costs can be reduced.

Instead of or in addition to the actuator 75, a sensor (not shown) may be provided in the movable portion 65. A plurality of sensors may be provided. The sensor detects a target different from a detection target of the sensors 25 (see FIG. 10) that detect movements of the movable portion 65.

In the case described above, for example, the sensor may include a function of detecting that the operator has gripped the grip portion 64. In that case, a pressure sensor, a temperature sensor, a contact sensor, a force sensor, a distance measurement sensor, or the like is used as the sensor.

Alternatively, the sensor may be a sensor capable of detecting movements that cannot be detected by the sensors 25, such as an acceleration and angular velocity of the movable portion, for example.

It should be noted that in the sixth embodiment, the tension members 35 are mainly formed of wires, but as will be described later, a coil spring may be used instead of the wire.

7. Various Other Embodiments

The present technology is not limited to the embodiments described above, and various other embodiments can be realized.

In the embodiments above, 6 degrees of freedom and 3 degrees of freedom are taken as examples of the degree of freedom of movements, but the present technology is applicable to a parallel link structure having at least 2 degrees of freedom regarding the degree of freedom of movements.

In the embodiments above, a long spring is used as the tension member. However, the present technology is not limited to this, and the tension member may include a function of substantially expanding and contracting also in the longitudinal direction thereof to generate a spring force. In this case, for example, rubber or a coil spring is used as the tension member. Due to the use of a coil spring, a plastic deformation of the tension member is unlikely to occur, and thus it becomes difficult for the tension member to break. By using the coil spring in the operation apparatuses 200 (FIG. 10) and 200A (see FIG. 13) in particular, there are advantages that durability is improved and it becomes difficult for the operation apparatus to break even when operated by the operator.

In a case where a coil spring is used, the parallel link robot or the operation apparatus may further include a sensor that detects a deformation of the coil spring. The deformation is compression, extension, bending, and the like. For example, the sensor is electrically connected to the coil spring and detects an eddy current generated by the deformation of the coil spring, with the result that the sensor or the computer can calculate a degree of the deformation (compression degree, extension degree, and bending degree) of the coil spring. Accordingly, the sensor or the computer can calculate, for example, a movement (operation amount) of the operation unit input to the operation apparatus. The tension member is not limited to the coil spring, and other tension members may be similarly used so that this sensor detects the deformation by detecting an eddy current.

Although the movable portion 60 has a plate-like shape, it may take any shape. It is favorable for that shape to be symmetrical or have the same shape in 3 directions (radial directions set every 120°) as seen in the z-axis direction, in terms of structural design and control operation.

The motor may include a deceleration function. The deceleration function can be realized by a deceleration structure that uses gears and wires. By using the wire deceleration structure, back drivability can be enhanced.

In the embodiments above, the motors 15 that use the rotation shafts 16 as the power shafts are used as the drive sources. However, in place of this, a linear actuator such as a voice coil motor and a fluid pressure cylinder may be used. Similarly, for the links 13 shown in FIG. 10, a link that makes a linear movement may be used.

Instead of 2-dimensionally arranging the motors 15 along the horizontal plane as in the embodiments above, the motors 15 may be arranged 3-dimensionally by adding the z direction. However, it is favorable for the arrangement of the motors 15 to be symmetrical or have the same shape in 3 directions (radial directions set every 120°) as seen in the z-axis direction, in terms of structural design and control operation.

In the embodiments above, the configuration in which the control board and the like are provided outside the base 11 has been described. However, these control boards and the like may be arranged inside the base 11 (e.g., within casing).

In the third embodiment (see FIG. 10), the parallel link robot 100C may include sensors (e.g., rotary encoders, potentiometers, etc.) respectively connected to the links 13. In other words, the parallel link robot 100C may also include a function as the operation apparatus. Similarly, the operation apparatus 200 may include motors as drive sources, that are respectively connected to the links 23.

For example, in the operation apparatus 200 shown in FIG. 10, a substrate on which the plurality of sensors 25 are mounted may be designed to be small so that the operation apparatus is made as small as possible, for example. Further, in this case, to enable the operator to grip the operation apparatus with his/her hand or a plurality of fingers to operate the movable portion (operation unit) 120 with one finger (e.g., thumb etc.), for example, the movable portion of the operation apparatus may include a knob portion or a ring (ring into which finger is inserted).

In the respective embodiments above, the motors 15 are arranged on the base 11 such that the rotation shafts 16 of the motors 15 output outwardly. However, on the contrary, the motors 15 may be arranged such that the rotation shafts 16 of the motors 15 output inwardly (toward center of base as viewed in z-axis direction).

In this case, the design of the shape and size of the base is changed as appropriate. With such a configuration, the links connected to the rotation shafts 16 are arranged on the inner side of the motors so as to not become an obstacle. In addition, the length of the tension members can be shortened, and a height of the entire apparatus can be lowered.

At least two of the feature portions according to the respective embodiments described above can be combined.

It should be noted that the present technology can also take the following configurations.

(1) A parallel link robot, including:
  a movable portion;
  a base;
  a plurality of drive sources attached to the base;
  a plurality of links respectively connected to the plurality of drive sources; and
  a tension member that is connected between the movable portion and at least one of the plurality of links such that a bending tension is generated.

(2) The parallel link robot according to (1), in which
  the tension member is connected to at least one of the plurality of links and is also connected to the movable portion.

(3) The parallel link robot according to (2), in which
  the plurality of links include a plurality of pairs of links in which a pair of links is provided plurally, and
  both end portions of the tension member are respectively connected to at least the pair of links, and a center portion of the tension member is connected to the movable portion.

(4) The parallel link robot according to any one of (1) to (3), in which
  the base is formed in a vessel shape to accommodate the plurality of drive sources, and
  the plurality of links are connected to power shafts of the plurality of drive sources at an outer circumferential portion of the base.

(5) The parallel link robot according to any one of (1) to (4), in which
  the tension member is a long spring that generates the bending tension by being bent.

(6) The parallel link robot according to any one of (1) to (4), in which
  the tension member is a coil spring.

(7) The parallel link robot according to any one of (1) to (5), in which the plurality of drive sources include a plurality of pairs of drive sources in which a pair of drive sources is provided plurally, and the base includes a common attachment surface to which the pair of drive sources is attached such that power shafts of the pair of drive sources become parallel to each other.

(8) The parallel link robot according to any one of (1) to (5), in which the base includes an attachment surface to which the plurality of drive sources are attached, and supports the plurality of drive sources such that power shafts of the plurality of drive sources become vertical to the attachment surface.

(9) The parallel link robot according to (1), in which the tension member includes a first part configuring at least one of the plurality of links, and a second part that generates the bending tension.

(10) The parallel link robot according to any one of (1) to (9), further including a restriction mechanism that restricts a degree of freedom regarding a movement of the movable portion.

(11) The parallel link robot according to (10), in which the restriction mechanism includes a joint portion that is provided between the base and the movable portion and includes a movable area having one or a plurality of degrees of freedom.

(12) The parallel link robot according to any one of (1) to (7), further including a plurality of sensors that respectively detect movements of the plurality of links.

(13) An operation apparatus, including:

a movable portion;

a base;

a plurality of links movably provided on the base;

a plurality of sensors that respectively detect movements of the plurality of links; and a tension member that is connected between the movable portion and at least one of the plurality of links such that a bending tension is generated.

(14) The operation apparatus according to (9), in which the tension member is connected to at least one of the plurality of links and is also connected to the movable portion.

(15) The operation apparatus according to (10), in which the plurality of links include a plurality of pairs of links in which a pair of links is provided plurally, and both end portions of the tension member are respectively connected to at least the pair of links, and a center portion of the tension member is connected to the movable portion.

(16) The operation apparatus according to any one of (9) to (11), in which the tension member is a long spring that generates the bending tension by being bent.

(17) The operation apparatus according to any one of (13) to (15), in which the tension member is a coil spring.

(18) The operation apparatus according to any one of (13) to (17), further including a restriction mechanism that restricts a degree of freedom regarding a movement of the movable portion.

(19) The operation apparatus according to (18), in which the restriction mechanism includes a joint portion that is provided between the base and the movable portion and includes a movable area having one or a plurality of degrees of freedom.

(20) The operation apparatus according to any one of (13) to (19), in which the movable portion includes an actuator or a sensor.

(21) The operation apparatus according to (20), further including a circuit unit provided in the base, in which a conductive material of the tension member functions as a conductive wire that electrically conducts the circuit unit and the actuator or the sensor.

(22) The parallel link robot according to any one of (1) to (12), further including a sensor that detects a deformation of the tension member.

(23) The operation apparatus according to any one of (13) to (21), further including a sensor that detects a deformation of the tension member.

REFERENCE SIGNS LIST 11 base
13, 23 link
15 motor
25 sensor
30, 32, 35 tension member
32a first part
32b second part
60, 65 movable portion
75 actuator
77 circuit board
90 restriction mechanism
92 joint portion
100A, 100B, 100C, 100D, 100E parallel link robot
200, 200A operation apparatus

The invention claimed is:

1. A parallel link robot, comprising:
a movable portion;
a base;
a plurality of drive sources attached to the base;
a plurality of links respectively connected to the plurality of drive sources, wherein the plurality of links includes a plurality of pairs of links; and
a tension member configured to generate a bending tension, wherein
a center portion of the tension member is connected to the movable portion, a first end of the tension member is connected to a first link of a pair of links of the plurality of pairs of links, and a second end of the tension member is connected to a second link of the pair of links.

2. The parallel link robot according to claim 1, wherein the base has a vessel shape to accommodate the plurality of drive sources, and
the plurality of links is connected to power shafts of the plurality of drive sources at an outer circumferential portion of the base.

3. The parallel link robot according to claim 1, wherein the tension member is a long spring, and
the long spring is configured to generate the bending tension based on a bend in the long spring.

4. The parallel link robot according to claim 1, wherein the tension member is a coil spring.

5. The parallel link robot according to claim 1, wherein
the plurality of drive sources includes a plurality of pairs of drive sources,
the base includes a common attachment surface, and
a pair of drive sources of the plurality of pairs of drive sources is attached to the common attachment surface such that a power shaft of a first drive source of the pair of drive sources is parallel to a power shaft of a second drive source of the pair of drive sources.

6. The parallel link robot according to claim 1, wherein
the base includes an attachment surface,
the plurality of drive sources is attached to the attachment surface, and
the attachment surface supports the plurality of drive sources such that power shafts of the plurality of drive sources are vertical to the attachment surface.

7. The parallel link robot according to claim 1, wherein the tension member includes:
a first part that corresponds to at least one link of the plurality of links, and
a second part configured to generate the bending tension.

8. The parallel link robot according to claim 1, further comprising a restriction mechanism configured to restrict a degree of freedom corresponding to a movement of the movable portion.

9. The parallel link robot according to claim 8, wherein
the restriction mechanism includes a joint portion that is between the base and the movable portion, and
the joint portion includes a movable area having at least one degree of freedom.

10. The parallel link robot according to claim 1, further comprising a plurality of sensors configured to detect movements of the plurality of links.

11. An operation apparatus, comprising:
a movable portion;
a base;
a plurality of links movable on the base, wherein the plurality of links includes a plurality of pairs of links;
a plurality of sensors configured to detect movements of the plurality of links; and
a tension member configured to generate a bending tension, wherein
a center portion of the tension member is connected to the movable portion, a first end of the tension member is connected to a first link of a pair of links of the plurality of pairs of links, and a second end of the tension member is connected to a second link of the pair of links.

12. The operation apparatus according to claim 11, wherein
the tension member is a long spring, and
the long spring is configured to generate the bending tension based on a bend in the long spring.

13. The operation apparatus according to claim 11, wherein the tension member is a coil spring.

14. The operation apparatus according to claim 11, further comprising a restriction mechanism configured to restrict a degree of freedom corresponding to a movement of the movable portion.

15. The operation apparatus according to claim 14, wherein
the restriction mechanism includes a joint portion that is between the base and the movable portion, and
the joint portion includes a movable area having at least one degree of freedom.

16. The operation apparatus according to claim 11, wherein the movable portion includes at least one of an actuator or a sensor.

17. The operation apparatus according to claim 16, further comprising a circuit unit in the base, wherein
a conductive material of the tension member functions as a conductive wire, and
the conductive wire electrically connects the circuit unit and at least one of the actuator or the sensor.

18. An operation apparatus, comprising:
a movable portion that includes at least one of an actuator or a sensor;
a base;
a plurality of links movable on the base;
a plurality of sensors configured to detect movements of the plurality of links;
a tension member configured to generate a bending tension, wherein the tension member is connected between the movable portion and at least one link of the plurality of links; and
a circuit unit in the base, wherein
a conductive material of the tension member functions as a conductive wire, and
the conductive wire electrically connects the circuit unit and at least one of the actuator or the sensor.

* * * * *